US008684156B1

(12) United States Patent
Chang

(10) Patent No.: US 8,684,156 B1
(45) Date of Patent: Apr. 1, 2014

(54) BILL ACCEPTOR WITH BILL PASSAGE ANTI-LIGHT POLLUTION ARRANGEMENT

(71) Applicant: International Currency Technologies Corporation, Taipei (TW)

(72) Inventor: Chia-Min Chang, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 0 days.

(21) Appl. No.: 13/751,439

(22) Filed: Jan. 28, 2013

(51) Int. Cl.
*G07F 7/04* (2006.01)
*G06K 7/00* (2006.01)
*G06K 9/00* (2006.01)
*G07D 7/00* (2006.01)

(52) U.S. Cl.
USPC ............................ 194/207; 382/135; 194/344

(58) Field of Classification Search
USPC .................... 194/206, 207; 209/534; 382/135
See application file for complete search history.

(56) References Cited

U.S. PATENT DOCUMENTS

2004/0178044 A1* 9/2004 Mori et al. .................... 194/206
2005/0286129 A1* 12/2005 Huber ........................... 359/501
2008/0247071 A1* 10/2008 Niwa et al. .................... 359/892
2009/0242353 A1* 10/2009 Yu et al. ........................ 194/207
2009/0294242 A1* 12/2009 Yu et al. ........................ 194/206
2009/0302113 A1* 12/2009 Li et al. .......................... 235/454
2009/0321217 A1* 12/2009 Yu et al. ........................ 194/207
2010/0320056 A1* 12/2010 Yu et al. ........................ 194/202
2011/0061988 A1* 3/2011 Lonsdale ...................... 194/303
2011/0216421 A1* 9/2011 Shirasaki ...................... 359/629

* cited by examiner

*Primary Examiner* — Jeffrey Shapiro
(74) *Attorney, Agent, or Firm* — Muncy, Geissler, Olds & Lowe, P.C.

(57) ABSTRACT

A bill acceptor capable of reducing light pollution, avoiding errors and faults and enhancing detection accuracy and reliability is disclosed to include a housing defining a bill slot in a face panel thereof, a bill-receiving unit accommodated in the housing and including a holder base defining therein a bill passage in communication with the bill slot, a control module, a transmission mechanism and a recognition circuit assembly, the recognition circuit assembly including a sampling and validating module consisting of a plurality of light emitters and light sensors and controllable by the control module to validate the authenticity and face value of an inserted bill, and privacy filters mounted in a light path in the bill-receiving unit between the bill passage and the light sensors to filtrate external light sources and to let the light emitted by the light emitters pass toward the light sensors.

8 Claims, 6 Drawing Sheets

BILL ACCEPTOR WITH BILL PASSAGE ANTI-LIGHT POLLUTION ARRANGEMENT

BACKGROUND OF THE INVENTION

1. Field of the Invention

The present invention relates to bill acceptor technology and more particularly, to a bill acceptor with bill passage anti-light pollution arrangement, which has privacy filters installed in the light path of the bill-receiving unit thereof to reduce light pollution, avoiding errors and faults and enhancing detection accuracy and reliability.

2. Description of the Related Art

Following fast development of modern technology, convenience and rapidness have become important demands in our modern daily life. Nowadays, different automatic vending machines, card dispensers, auto teller machines, ticket machines and bill exchange machines are used everywhere to sell different products and/or to provide different services without serviceman. These machines are highly appreciated for the advantage of saving much labor and bringing convenience to people.

Further, commercial automatic vending machines, auto teller machines and other consumer systems may be equipped with a bill acceptor for receiving paper money. To avoid direct loss due to counterfeiting and to avoid inadvertently passing counterfeit valuable papers to consumers, a bill acceptor has recognition means to recognize the authenticity of a valuable paper before receiving it. However, the bill passage of a bill acceptor is specifically designed for a particular valuable paper of one specific width. Because different valuable papers issued from different countries have different sizes (length, width and thickness) and different anti-counterfeit characteristics at different locations. A valuable paper that is inserted into a bill acceptor must be kept in accurate alignment with the recognition device so that the recognition device can accurate recognize the anti-counterfeit characteristics. If a valuable paper is inserted into a bill acceptor in an offset manner, the recognition device of the bill acceptor may reject the valuable paper due to a recognition error. In this case, the user must insert the valuable paper again, causing inconvenience.

Further, during the operation of a recognition device of a bill acceptor to validate the authenticity of an inserted valuable paper, a light emitter (for example, light-emitting diode) of the recognition device emits light through a lens set and the inserted valuable paper toward a light sensor. The light sensor determines the authenticity of the valuable paper by measuring the energy of the light that passes through the inserted valuable paper. Subject to the anti-counterfeit characteristics (watermark, seal, hidden barcode or laser tag) and material thickness, the authenticity and face value of the inserted valuable paper can be accurately validated.

However, during validation operation of a recognition device of a bill acceptor, sunlight or external luminous light or flashing light may pass through the bill slot of the face panel into the internal bill passage of the bill acceptor to fall upon the dust cover and the lens set of the recognition device to interfere with the light being emitted by the light emitter toward the light sensor, resulting in a false detection or detection error. The dust cover has wear-resistant, dustproof and anti-stain characteristics, but it cannot filtrate external light rays to eliminate light pollution. When a light pollution occurs, the validation accuracy will be affected. If an inserted valuable paper cannot be validated and is rejected, the user shall have to insert the valuable paper into the bill slot again, causing inconvenience.

Therefore, it is desirable to provide a bill acceptor that filtrates light pollution, avoiding errors and faults.

SUMMARY OF THE INVENTION

The present invention has been accomplished under the circumstances in view. It is therefore one object of the present invention to provide a bill acceptor with bill passage anti-light pollution arrangement, which reduces light pollution, avoids errors and faults, and enhances detection accuracy and reliability.

To achieve this and other objects of the present invention, a bill acceptor comprises a housing defining a bill slot in a face panel thereof for the insertion of a bill, a bill-receiving unit accommodated in the housing, and at least one privacy filter mounted in the bill-receiving unit to prevent light pollution. The bill-receiving unit comprises a holder base defining therein a bill passage in communication with the bill slot, a control module, a transmission mechanism controllable by the control module to transfer an inserted bill, and a recognition circuit assembly mounted in opposing top and bottom sides of the bill passage. The recognition circuit assembly comprises a sampling and validating module consisting of a plurality of light emitters and light sensors and controllable by the control module to validate the authenticity and face value of an inserted bill. The at least one privacy filter is mounted in a light path in the bill-receiving unit between the bill passage and the light sensors to filtrate external light sources and to let the light emitted by the light emitters pass toward the light sensors.

Further, the holder base of the bill-receiving unit comprises at least one light transmissive portion disposed around the bill passage corresponding to the recognition circuit assembly, a privacy filter locating groove extending around each light transmissive portion, and a dust cover mounted in each privacy filter locating groove to hold one respective privacy filter in each privacy filter locating groove. The privacy filter is made using blind ultra-fine (micro louver) optical technology, and designed to control reflection of light and to reduce glare. The privacy filter decreases the angle of the light path in the bill passage, allowing only the light emitted by the light emitters to pass through the bill passage toward the light sensors. Further, the privacy filter with the respective dust cover can be made in any of a variety of shapes and sizes subject to requirements without affecting the original dust protection function of the dust cover.

Further, the holder base of the bill-receiving unit comprises at least one light transmissive portion disposed around the bill passage corresponding to the recognition circuit assembly, a privacy filter locating groove extending around each light transmissive portion, and a dust cover mounted in the privacy filter locating groove to hold one respective privacy filter in the at least one light transmissive portion. Further, the control module of the bill-receiving unit comprises two circuit boards respectively mounted in the holder base at opposing top and bottom sides of the bill passage, a plurality of sensors installed in the circuit boards and adapted to sense the insertion of a bill into the bill slot, a bearing shell mounted at each circuit board over the sensors at the respective circuit board. The bearing shell comprises a privacy filter locating groove accommodating at least one privacy filter, and a plurality of retaining protrusions projecting into the privacy filter locating groove to hold at least one privacy filter in the privacy filter locating groove. The privacy filter at the bearing shell filtrates external light rays that are not emitted by the light emitters, reducing light pollution, avoiding errors and faults, and prolonging the lifespan of the bill acceptor.

DETAILED DESCRIPTION OF THE PREFERRED EMBODIMENT

Figure 1:
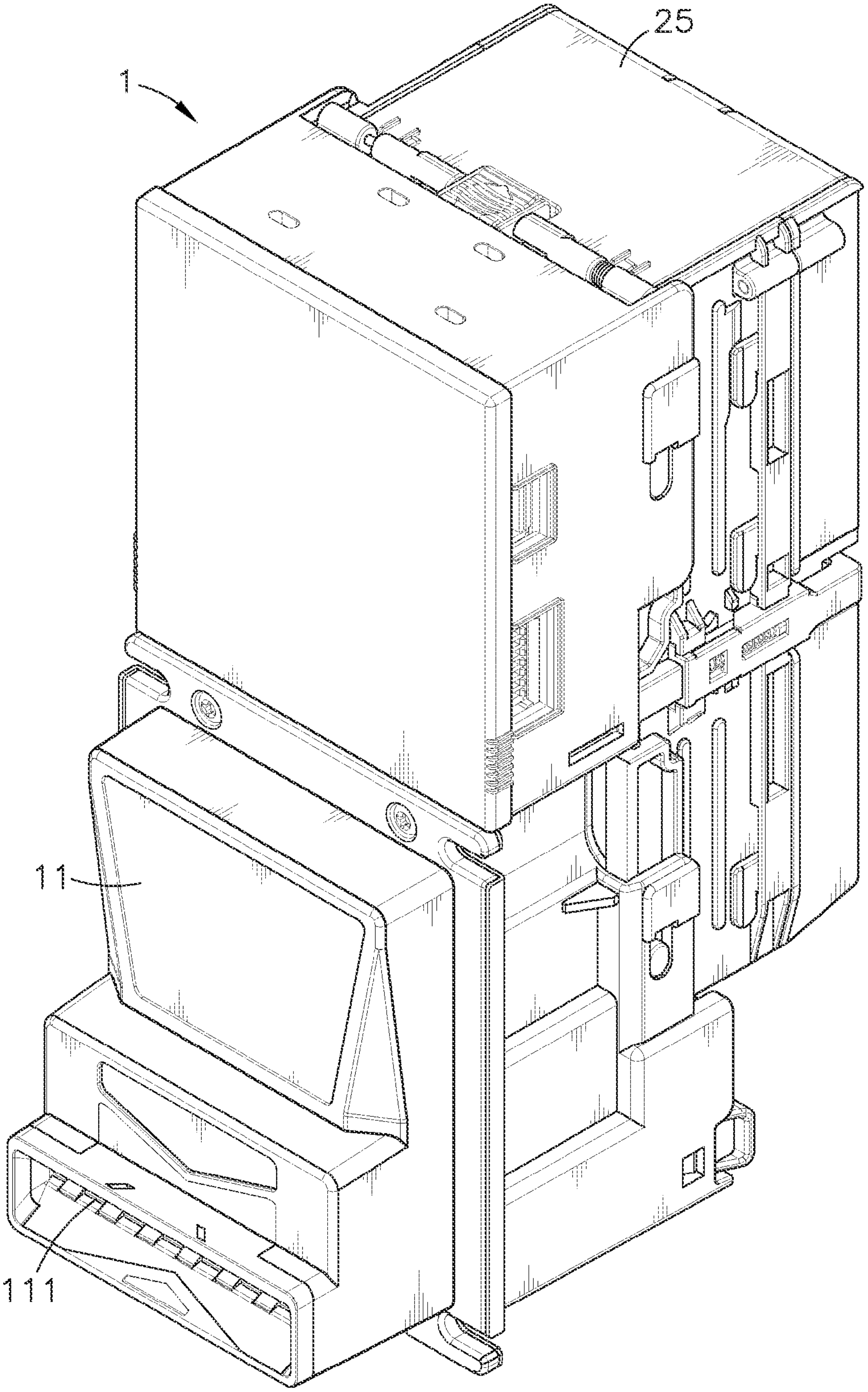
FIG. 1 is an elevational view of a bill acceptor with bill passage anti-light pollution arrangement in accordance with the present invention.
Figure 2:
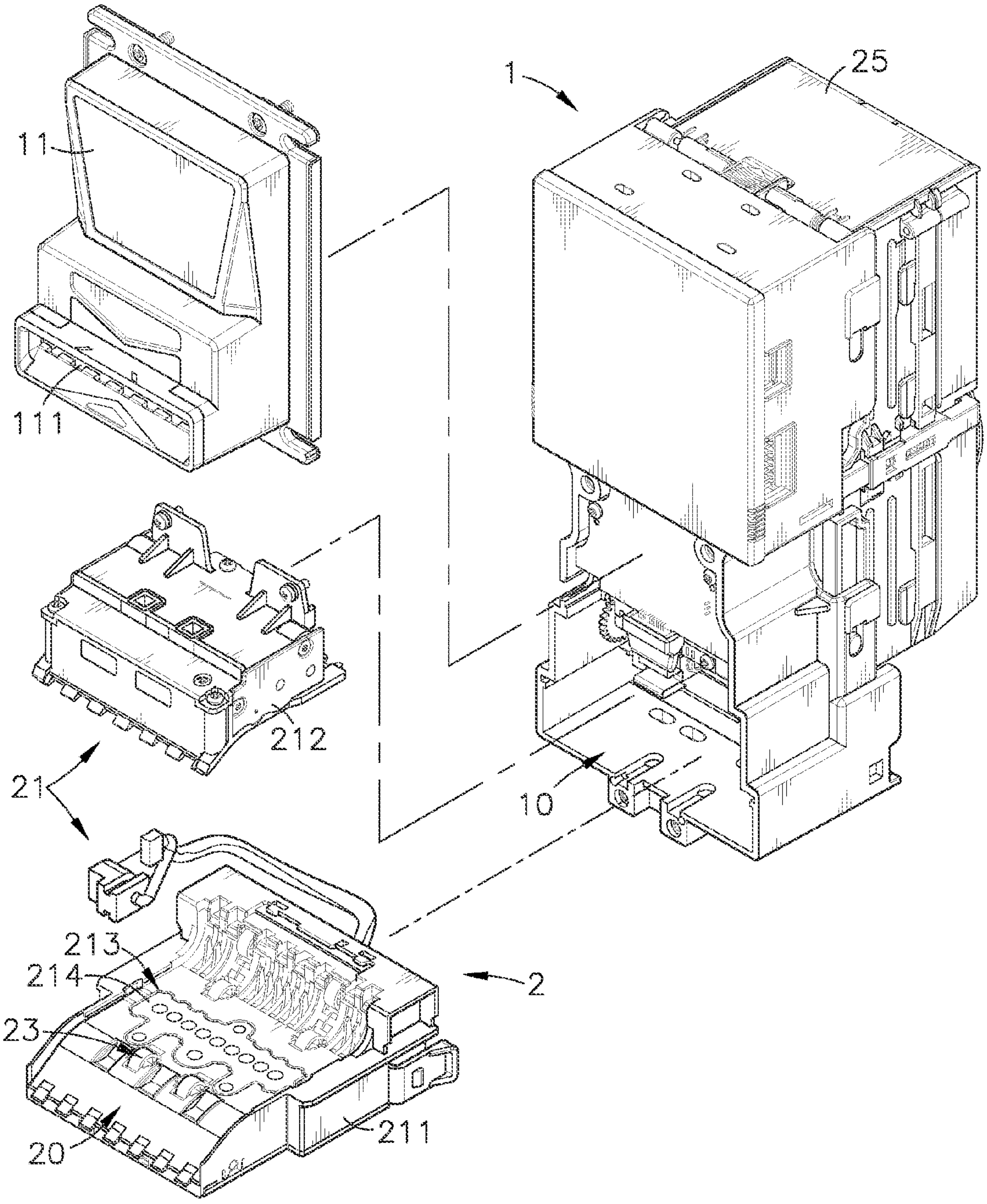
FIG. 2 is an exploded view of the bill acceptor with bill passage anti-light pollution arrangement in accordance with the present invention.
Figure 3:
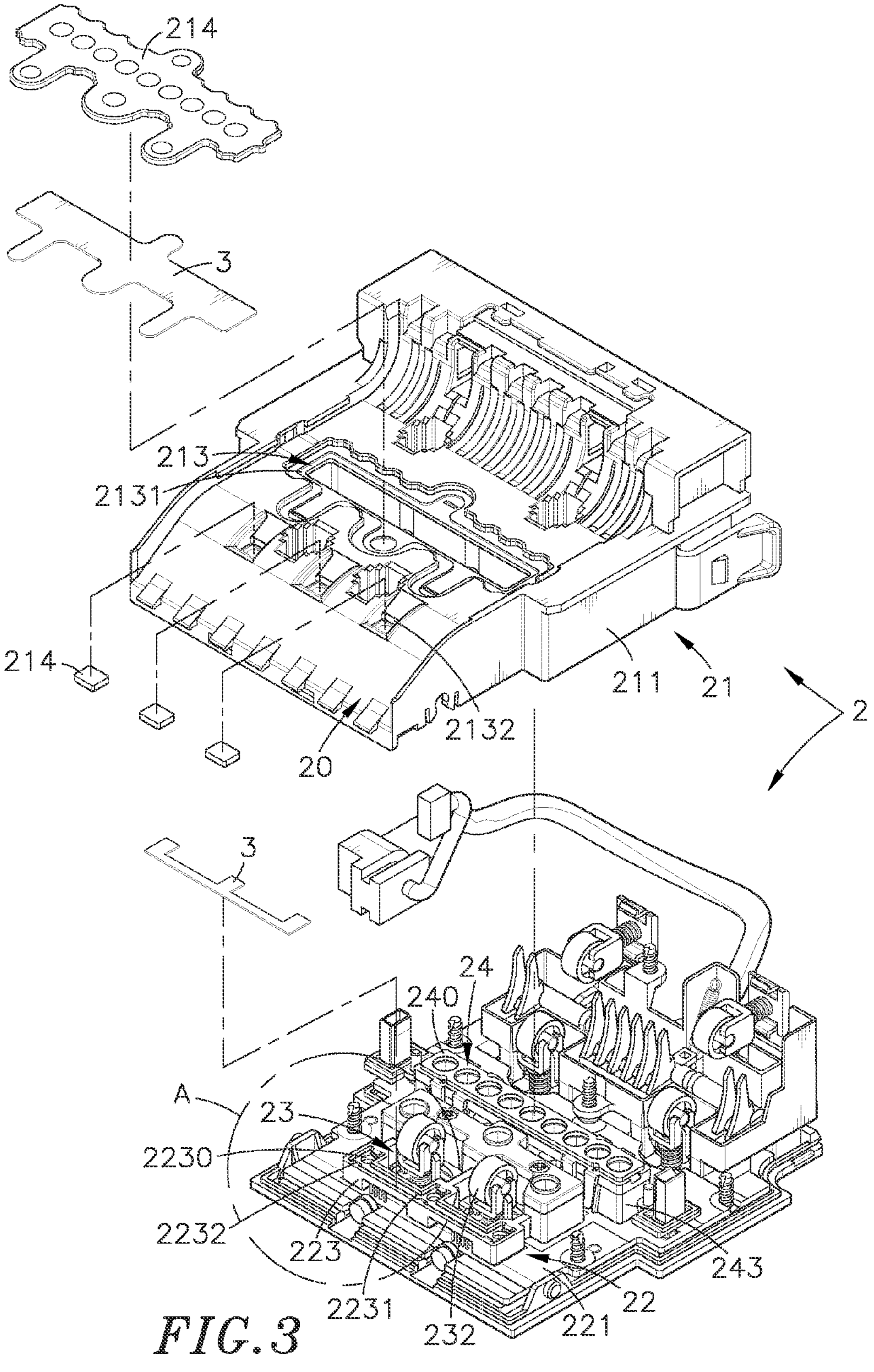
FIG. 3 is an exploded view of the bill-receiving unit of the bill acceptor with bill passage anti-light pollution arrangement in accordance with the present invention.
Figure 4:
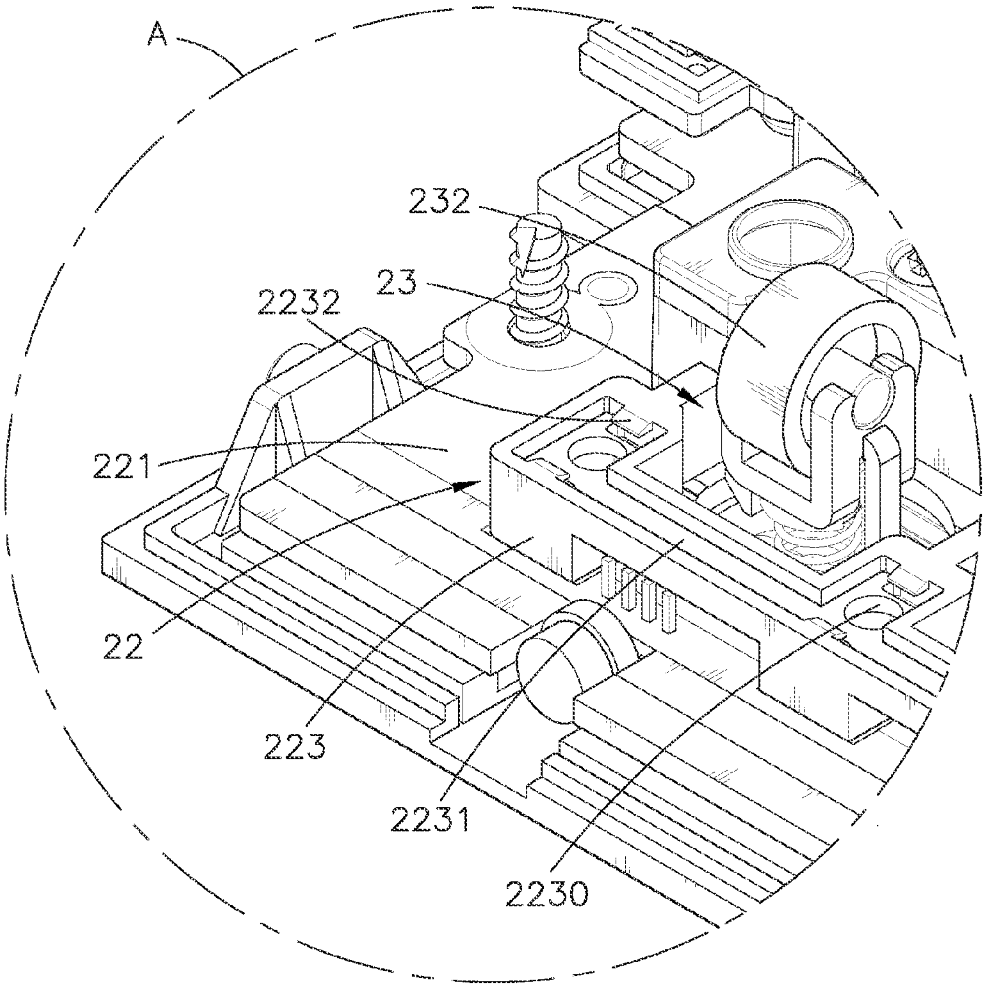
FIG. 4 is an enlarged view of part A of FIG. 3.
Figure 5:
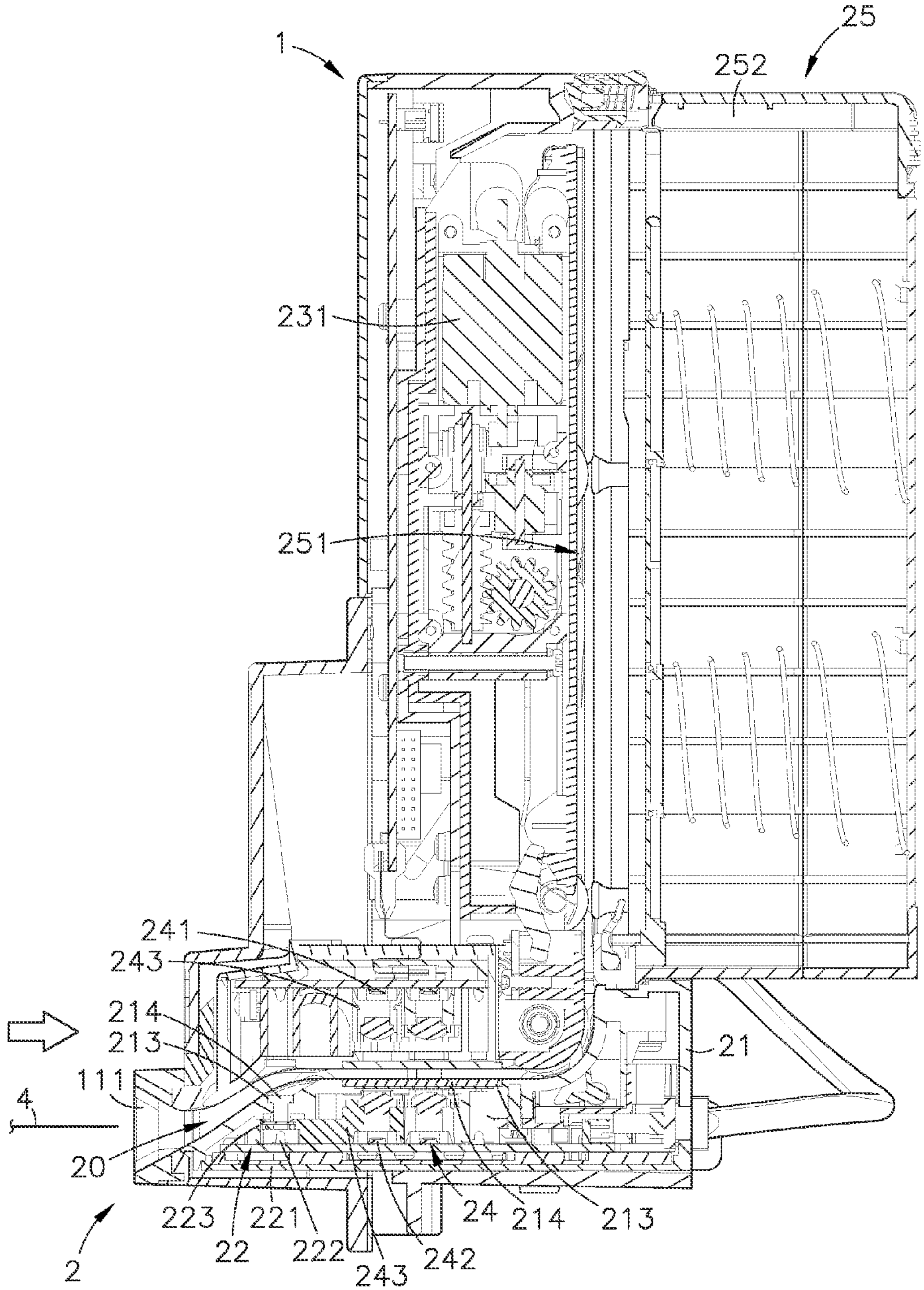
FIG. 5 is a sectional side view of the bill acceptor with bill passage anti-light pollution arrangement in accordance with the present invention.
Figure 6:
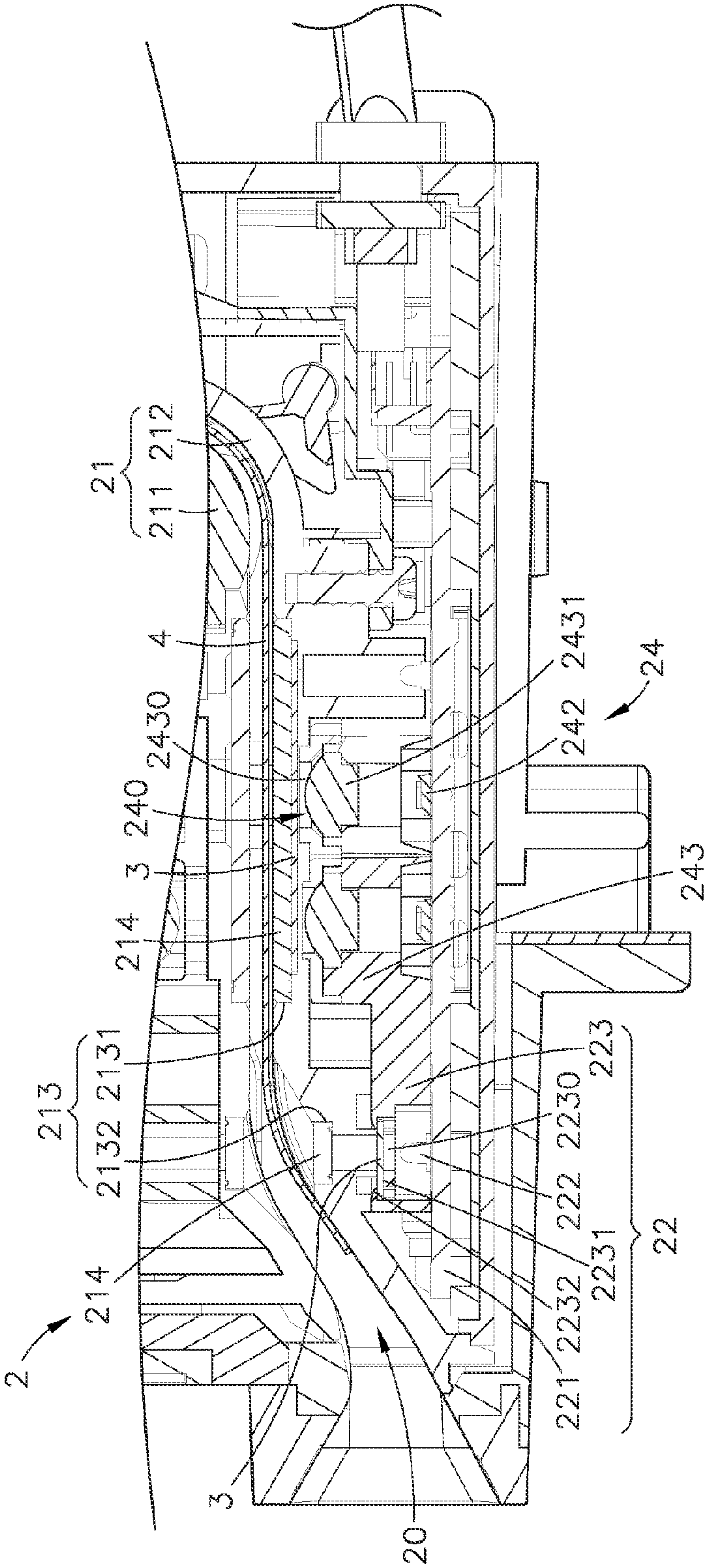
FIG. 6 is a sectional side view, in an enlarged scale, of a part of the bill acceptor with bill passage anti-light pollution arrangement in accordance with the present invention.

Referring to FIGS. 1-6, a bill acceptor with bill passage anti-light pollution arrangement in accordance with the present invention is shown comprising a housing 1, and a bill-receiving unit 2. The housing 1 comprises a face panel 11 defining a bill slot 111. Further, the housing 1 defines therein an accommodation chamber 10. The bill-receiving unit 2 is accommodated, in the accommodation chamber 10 of the housing 1, comprising a holder base 21 consisting of a first base member 211 and a second base member 212, a bill passage 20 defined between the first base member 211 and the second base member 212 in communication with the bill slot 111, a control module 22, a transmission mechanism 23 and a recognition circuit assembly 24 mounted in top and bottom sides of the bill passage 20, and a bill box 25 mounted at the rear side of the housing 1. The control module 22 comprises two circuit boards 221 respectively mounted in the top and bottom sides of the bill passage 20 near the bill slot 111, and a plurality of sensors 222 installed in the circuit boards 221 and adapted to sense the presence of an inserted bill 4 and to control on/off of the transmission mechanism 23. The transmission mechanism 23 comprises at least one motor 231 and at least one bill-transfer roller set 232 rotatable by the at least one motor 231 to transfer each inserted bill 4 to the recognition circuit assembly 24 for validating its authenticity and face value. The bill box 25 comprises a bill pressing-down mechanism 251 and a box body 252.

Further, the recognition circuit assembly 24 comprises a sampling and validating module 240 for validating the authenticity and face value of an inserted bill 4. The sampling and validating module 240 comprises a plurality of light emitters 241 installed in one circuit board 221 of the control module 22, a plurality of light sensors 242 installed in the other circuit board 221 of the control module 22 and respectively aimed at the light emitters 241, and a plurality of lens holders 243 respectively mounted around the light emitters 241 and the light sensors 242. The light emitters 241 can be light-emitting diodes of different colors. In this embodiment, the sampling and validating module 240 is a transmissive optical sensor module. However, this design is not a limitation, i.e., reflective optical sensor design or contact image sensor design can be selectively used as a substitute.

Further, the holder base 21 of the bill-receiving unit 2 comprises two light transmissive portions 213 disposed at opposing top and bottom sides of the bill passage 20 corresponding to the recognition circuit assembly 24, a locating groove 2131 extending around each light transmissive portion 213, a privacy filter 3 mounted with a dust cover 214 in each locating groove 2131 over the respective light transmissive portion 213. Preferably, the privacy filter 3 is disposed in the light path of the light sensors 242 that passes through the bill passage 20. Further, the privacy filter 3 can be directly bonded to an outer side of the dust cover 214 opposite to the bill passage 20. Further, each lens holder 243 comprises a through hole 2430 corresponding to one light sensor 242, and a lens set 2431 mounted in the through hole 2430.

The privacy filters 3 are multilayer filters made using blind ultra-fine (micro louver) optical technology, designed to control reflection of light and to reduce glare. The privacy filters 3 decrease the angle of the light path in the bill passage 20, allowing only the light emitted by the light emitters 241 to pass through the bill passage 20 at 90° angle or 60°±5° angle. The privacy filters 3 have wear-resistant, dustproof and anti-stain characteristics. Further, the privacy filters 3 with the respective dust covers 214 can be made in any of a variety of shapes and sizes subject to requirements without affecting the original dust protection function of the dust covers 214. Further, two or more privacy filters 3 can be arranged in a stack and mounted with one dust cover 214 for application. As the materials, optical structure and fabrication of the privacy filters 3 are of the known art, no further detailed description in this regard will be necessary.

The bill acceptor with bill passage anti-light pollution arrangement in accordance with the present invention can be used in an automatic vending machine, auto teller machine, game console, or any of a variety of other consumer systems. After installation of the bill acceptor in the housing of the automatic vending machine, auto teller machine, game console or consumer system, the circuit boards 221 of the control module 22 of the bill-receiving unit 2 are electrically connected to the power circuit and main unit of the automatic vending machine, auto teller machine, game console or consumer system by electrical connectors (not shown) for the transmission of power supply and data, enabling the automatic vending machine, auto teller machine, game console or consumer system to provide bill-validating, bill-receiving and bill-rejecting functions. Further, the bill acceptor is capable of validating any of a variety of bills 4 that can be paper notes, valuable securities (such as banker's checks, banker's drafts, stocks, ownership certificates, prepaid tickets, gift certificates, etc.) or security documents (such as ID cards, drivers licenses, vehicle licenses, passports, etc.).

When a person inserts a bill 4 into the bill slot 111 of the face panel 11 of the housing 1, the bill 4 will enter the bill passage 20 of the bill-receiving unit 2 to induce the sensors 222 of the control module 22. When one or a number of the sensors 222 of the control module 22 is induced by the inserted bill 4, the control module 22 immediately drives the at least one motor 231 of the transmission mechanism 23 to transfer the bill 4 to the recognition circuit assembly 24, enabling the sampling and validating module 240 to validate the authenticity and face value of the bill 4 subject to the functioning of the light emitters 241 and the light sensors 242 and the control of the control module 22. If the bill 4 is recognized to be authentic, the transmission mechanism 23 will be controlled by the control module 22 to transfer the bill 4 to the bill box 25, enabling the bill pressing-down mechanism 251 to press the bill 4 into the inside of the box body 252. If the bill 4 is validated to be a counterfeit, the transmission mechanism 23 will be controlled by the control module 22 to transfer the bill 4 backwardly to the bill slot 111 of the face panel 11 of the housing 1.

Further, during operation of the light emitters 241 and light sensors 242 of the sampling and validating module 240 to validate the authenticity and face value of the bill 4, the light emitters 241 emit light toward the lens sets 2431 in the through holes 2430 of the surrounding lens holders 243. At this time, the emitted light goes through the privacy filter 3 in the proximal dust cover 214, then the bill passage 20 and the bill 4, and then the privacy filter 3 in the distal dust cover 214 and then the lens sets 2431 in the through holes 2430 of the distal lens holders 243, and then falls upon the light sensors 242. Thus, the light sensors 242 can measure the energy of the incident light accurately, enabling the sampling and validating module 240 to determine the authenticity and face value of the bill 4. The privacy filters 3 filtrate external sunlight, indoor luminous light and other full-spectrum light sources that are not emitted by the light emitters 241, reducing light pollution, avoiding errors and faults, and enhancing detection accuracy and reliability.

Referring to FIGS. 3, 4 and 6 again, the holder base 21 of the bill-receiving unit 2 further comprises a plurality of mounting grooves 2132, a plurality of dust covers 214 respectively mounted in the mounting grooves 2132 over the respective light transmissive portion 213. The control module 22 further comprises a bearing shell 223 mounted at each circuit board 221 over the respective sensors 222. The bearing shell 223 comprises a locating groove 2231, a plurality of through holes 2230 disposed in the locating groove 2231 corresponding to the sensors 222, a privacy filter 3 mounted in the locating groove 2231 and covered over the through holes 2230, and a plurality of retaining protrusions 2232 projecting into the locating groove 2231 and pressed on the privacy filter 3 to hold the privacy filter 3 in the locating groove 2231 positively. The privacy filter 3 filtrates external light rays that are not emitted by the light emitters 241, reducing light pollution, avoiding errors and faults, and prolonging the lifespan of the bill acceptor.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A bill acceptor comprising:

a housing comprising a face panel defining a bill slot for the insertion of a bill;

a bill-receiving unit accommodated in said housing, said bill-receiving unit comprising a holder base defining therein a bill passage in communication with said bill slot, a control module, a transmission mechanism controllable by said control module to transfer an inserted bill, and a recognition circuit assembly mounted in opposing top and bottom sides of said bill passage, said recognition circuit assembly comprising a sampling and validating module consisting of a plurality of light emitters and light sensors and controllable by said control module to validate the authenticity and face value of an inserted bill; and at least one privacy filter mounted in a light path in said bill-receiving unit between said bill passage and said light sensors to filtrate external light sources and to let the light emitted by said light emitters pass toward said light sensors, said at least one privacy filter comprising a multilayer filter made of blind ultra-fine optical technology configured to allow only light emitted by the plurality of light emitters to pass through the bill passage at an angle of 90° or 60°±5°.

2. The bill acceptor as claimed in claim 1, wherein said holder base of said bill-receiving unit comprises at least one light transmissive portion disposed around said bill passage corresponding to said recognition circuit assembly, and a privacy filter locating groove extending around each said light transmissive portion to accommodate at least one said privacy filter.

3. The bill acceptor as claimed in claim 2, wherein each said privacy filter locating groove accommodates two said privacy filters in a stack.

4. The bill acceptor as claimed in claim 2, wherein said holder base of said bill-receiving unit further comprises a dust cover mounted in each said privacy filter locating groove to hold at least one said privacy filter in each said privacy filter locating groove.

5. The bill acceptor as claimed in claim 1, wherein said control module of said bill-receiving unit comprises two circuit boards respectively mounted in said holder base at opposing top and bottom sides of said bill passage, and a plurality of sensors installed in said circuit boards and adapted to sense the insertion of a bill into said bill slot; said light emitters and light sensors of said sampling and validating module of said recognition circuit assembly are respectively installed in said two circuit boards of said control module of said bill-receiving unit.

6. The bill acceptor as claimed in claim 5, wherein said sampling and validating module further comprises a plurality of lens holders respectively mounted around said light emitters and said light sensors, each said lens holder comprising a through hole aimed at one said light sensor and a lens set mounted in said through hole.

7. The bill acceptor as claimed in claim 1, wherein said holder base of said bill-receiving unit comprises at least one light transmissive portion disposed around said bill passage corresponding to said recognition circuit assembly, and a privacy filter locating groove extending around each said light transmissive portion, a dust cover mounted in said privacy filter locating groove to hold at least one said privacy filter in said at least one light transmissive portion; said control module of said bill-receiving unit comprises two circuit boards respectively mounted in said holder base at opposing top and bottom sides of said bill passage, a plurality of sensors installed in said circuit boards and adapted to sense the insertion of a bill into said bill slot, and a bearing shell mounted at each said circuit board over the sensors at the respective circuit board, said bearing shell comprising a privacy filter locating groove.

8. The bill acceptor as claimed in claim 1, wherein said bearing shell comprises at least one through holes disposed in said privacy filter locating groove corresponding to the sensors; said privacy filter locating groove accommodates at least one said privacy filter and a plurality of retaining protrusions projecting into said privacy filter locating groove to hold at least one said privacy filter in said privacy filter locating groove.

* * * * *